US011395211B2

(12) United States Patent
Szrom et al.

(10) Patent No.: US 11,395,211 B2
(45) Date of Patent: Jul. 19, 2022

(54) SYSTEMS AND METHODS FOR RESTRICTING NETWORK TRAFFIC BASED ON GEOGRAPHIC INFORMATION

(71) Applicant: Verizon Patent and Licensing Inc., Arlington, VA (US)

(72) Inventors: Charles P. Szrom, Branchburg, NJ (US); Kevin Xu, Warren, NJ (US); Rashmitha Sirsi, Millburn, NJ (US); Valerie Feldmann, Morristown, NJ (US); Robert Belson, Rockville, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 68 days.

(21) Appl. No.: 16/853,239

(22) Filed: Apr. 20, 2020

(65) Prior Publication Data
US 2021/0329534 A1 Oct. 21, 2021

(51) Int. Cl.
*H04W 48/04* (2009.01)
*H04W 4/021* (2018.01)
*H04W 28/02* (2009.01)
*H04L 9/40* (2022.01)

(52) U.S. Cl.
CPC .......... *H04W 48/04* (2013.01); *H04W 4/021* (2013.01); *H04W 28/0226* (2013.01); *H04L 63/0227* (2013.01)

(58) Field of Classification Search
CPC . H04W 48/04; H04W 4/021; H04W 28/0226; H04L 63/107; H04L 63/0227; H04L 9/3236; H04B 7/18584; H04B 7/18593
See application file for complete search history.

(56) References Cited

U.S. PATENT DOCUMENTS 9,514,324 B1 * 12/2016 Potlapally ............... H04L 63/10
9,716,703 B2 * 7/2017 Entezari ................ H04W 4/021
(Continued)

OTHER PUBLICATIONS

J. Postel, "Internet Control Message Protocol," Network Working Group Request for Comments 792, Sep. 1981 (available at https://tools.ietf.org/html/rfc792, visited Apr. 20, 2020).

*Primary Examiner* — Oussama Roudani

(57) ABSTRACT

A system described herein may provide techniques for a geographically-based traffic handling policy. An originating device may mark traffic with geographic restriction information, such as in a header of network traffic, indicating a geographic restriction on the propagation of the traffic. The geographic restriction may indicate a geographic region in which the traffic may be forwarded, or a geographic region in which the traffic is prohibited from being forwarded. Network devices in a path between the originating device and a destination device may determine whether to drop the traffic or perform other policy-related actions based on whether such devices are inside the geographic region in which the traffic may be forwarded. In some implementations a destination device may register as an exception to such policies, based on which an originating device or a router may bypass geographically-based traffic handling policies with respect to marked traffic directed to the destination device.

20 Claims, 12 Drawing Sheets

(56) References Cited

U.S. PATENT DOCUMENTS

| | | | |
|---|---|---|---|
| 2013/0232565 A1* | 9/2013 | O'Connor | H04L 63/107 |
| | | | 726/13 |
| 2016/0125067 A1* | 5/2016 | Alexe | G06F 16/288 |
| | | | 707/603 |
| 2017/0048815 A1* | 2/2017 | Clarke | H04W 64/00 |
| 2017/0373990 A1* | 12/2017 | Jeuk | H04L 45/306 |
| 2020/0084303 A1* | 3/2020 | Liu | H04L 67/18 |
| 2020/0184092 A1* | 6/2020 | Meng | G06F 16/29 |

* cited by examiner

SYSTEMS AND METHODS FOR RESTRICTING NETWORK TRAFFIC BASED ON GEOGRAPHIC INFORMATION

BACKGROUND

Devices, such as mobile phones, laptop computers, "smart" devices, networked cameras, or the like, may communicate sensitive information over networks, such as a core of a wireless telecommunications network, the Internet, and/or other networks. Such networks may utilize routers, which may forward traffic from an originating device to a destination device (e.g., an application server).

DETAILED DESCRIPTION OF THE PREFERRED EMBODIMENTS

Figure 1:
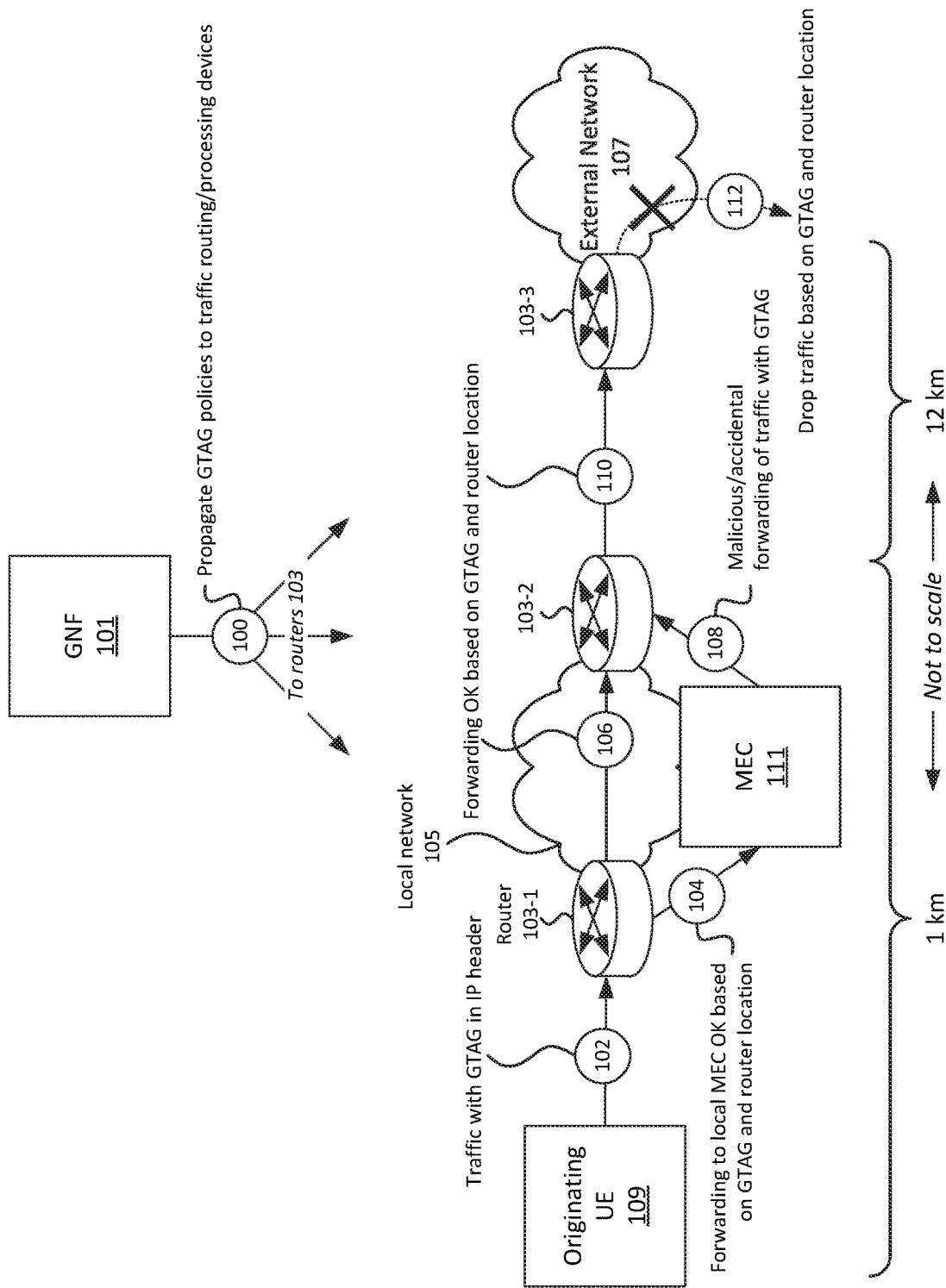
FIG. 1 illustrates an example overview of one or more embodiments described herein, in which propagation of traffic marked with a geolocation tag ("GTAG") may be restricted based on distance from an originating User Equipment ("UE")

The following detailed description refers to the accompanying drawings. The same reference numbers in different drawings may identify the same or similar elements.

Embodiments described herein provide for the ability for an originating device (e.g., a UE, such as a laptop computer, mobile phone, Internet of Things ("IoT") device (such as networked cameras, smart devices, or other IoT devices), etc.) to specify a geographic restriction (or other location-based policies) for traffic sent by the originating device towards a destination. For example, network traffic produced by an originating device may include a geographic restriction indication—referred to herein as a geolocation tag ("GTAG"). In some implementations, as described herein, the GTAG may be included in header information of traffic sent by an originating device, such as the header of Internet Protocol ("IP") message traffic. As described herein, routers and/or other network devices that receive the traffic may determine whether to forward the traffic or perform other operations based on policies associated with the GTAG. For example, a network device that receives the traffic may identify the presence of the GTAG, and then determine whether a geographic restriction associated with the GTAG should prevent the forwarding of the traffic due to the network device (or another network device on the network path to the destination, such as a next hop router) being outside of a geographical region associated with the geographic restriction. In some implementations, the geographical region may be specified as a maximum allowed distance from the originating device, and whether the geographic restriction applies may be determined by comparing the location of the originating device to the location of the network device. In other implementations, the geographical region may be specified using other delineations, such as geographic coordinates. A network device that receives the traffic and is determined to be outside of the geographical region, may drop the traffic instead of forwarding the traffic.

Such techniques, in accordance with some embodiments, may be useful in situations where sensitive data is intended to be transmitted over a limited physical distance, but is not intended or desired to be transmitted over larger distances. For example, sensitive institutional data may be intended to be sent to application servers on a local intranet of an office campus (e.g., within a 1-kilometer radius), but not to devices located outside of the office campus. As another example, a family may install a networked camera system that provides captured video to a server via the Internet, and the family may desire that video that includes children's faces not be propagated beyond a relatively short distance (e.g., beyond a neighborhood, apartment building, etc.). As yet another example, a user may wish to restrict the sending of sensitive personal information to a foreign country.

In some implementations, processing of GTAG-marked traffic may be assisted through the use of edge computing facilities deployed towards the edge of traffic-bearing networks. Edge computing facilities may include hardware and software components to implement an application execution infrastructure that can interface with network devices and/or UEs connected to the network. Edge computing facilities may be referred to as Multi-Access Edge Computing, Mobile Edge Computing, or similar nomenclature, and are referred to herein as "MECs."

As shown in FIG. 1, for example, a Geographic Network Function ("GNF") may propagate (at 100) GTAG policies to a set of network devices, such as routers 103 and/or edge computing facilities 111, associated with one or more networks. As shown, routers 103-1 and 103-2 may be a part of a first network (e.g., "local" network 105), while router 103-3 may be a part of a second network (e.g., "external" network 107). The terms "local" and "external" are used as relative terms in this example. That is, in this example, network 105 may be "local" to originating UE 109, MEC 111, router 103-1, and router 103-2, while network 107 may be "external" to these devices. Additionally, or alternatively, network 105 may have a first address space (e.g., a local domain, a subnet, etc.) while external network 107 may have a second address space.

In some embodiments, GNF 101 and/or routers 103 may implement a dynamic routing technique, such as Border Gateway Protocol ("BGP") or some other suitable routing technique, whereby messages, instructions, etc. outputted by GNF 101 may be received by routers 103. In some embodiments, GNF 101 may include, and/or may be communicatively coupled with, a BGP route reflector or other suitable component that is configured to output messages, instructions, etc. to routers 103. The GTAG policies, propagated (at 100) by GNF 101 may include instructions on how to handle traffic that includes a GTAG. Generally speaking, and as discussed below in greater detail, such policies may include forwarding or dropping traffic based on a location, range, proximity, etc. indicated by a GTAG.

The policies propagated by GNF 101 may be received from an administrator, operator, or other entity associated with GNF 101, local network 105, and/or external network 107. In some embodiments, GNF 101 may be associated with an application programming interface ("API"), open standard, dynamic routing protocol, and/or other suitable mechanism by which routers 103, MECs 111, and/or other network devices may receive, obtain, etc. GTAG policies from GNF 101. As discussed below, the information propagated (at 100) by GNF 101 may include network topographical information (e.g., an indication of routes or paths that may be implemented by routers 103 and/or other devices or systems), geographical information associated with one or more routers 103 (e.g., information indicating a geographical location corresponding to physical hardware that implements routing functions associated with routers 103), and/or other suitable information.

While discussed in the context of routers 103 receiving and implementing GTAG policies from GNF 101, in some embodiments, one or more other types of devices or systems may receive and/or implement GTAG policies. In some embodiments, GTAG policies may be received and implemented by one or more MECs, servers, and/or other types of devices that receive, process, inspect, forward, and/or perform other operations with respect to network traffic.

As further shown in FIG. 1 (e.g., after routers 103 have received the GTAG policies from GNF 101), originating UE 109 may output (at 102) traffic that is marked with a GTAG. For example, the traffic may include IP traffic, and the GTAG may be included in an IP header of the traffic. Example arrangements of such header information, in accordance with some embodiments, are discussed below. In this example, assume that originating UE 109 is connected to local network 105 (e.g., network 105 is "local" with respect to originating UE 109, and network 107 is "external" with respect to originating UE 109 and network 105). In some implementations, UE 109 may output network traffic without a GTAG, and a network device may insert a GTAG into the network traffic. For example, GTAG policies may specify that all traffic originating from certain UEs (or connected to certain portions of network 105) should receive GTAGs. In some implementations, UE 109 may output network traffic including GTAGs, and a network device may change the GTAG prior to forwarding through the network. For example, a network device having information concerning the location of the UE (e.g., a base station to which the UE is connected, a network device that maintains UE location information, and/or some other suitable device or system) may insert an indication of the location of the UE into the GTAG (e.g., appending to or overwriting a portion of the GTAG). Such capability may be useful to ensure accurate and/or precise location information for the UE.

The traffic may be received by router 103-1, which may determine whether to apply one or more GTAG policies to the traffic based on the GTAG information included in the traffic. For example, router 103-1 may determine whether to forward the traffic (e.g., to a next "hop" in a route between originating UE 109 and a destination associated with the traffic) based on the GTAG information. The GTAG information included in the traffic may indicate a geographical region that should restrict propagation of the traffic. For example, in some embodiments, the GTAG may indicate a location of originating UE 109 and/or a unique identifier of originating UE 109 based on which the location of originating UE 109 may be determined (e.g., based on information from GNF 101 that maps unique identifiers to geographical locations).

In some embodiments, the GTAG may indicate a geographical region in which the traffic is permitted to be propagated, a geographical region outside of which the traffic is not permitted to be propagated, and/or a geographical region in which the traffic is not permitted to be propagated. The geographical region may be specified in terms of, for example, a set of geographical coordinates (e.g., latitude and longitude) that define a geographical area or region, a name or identifier of a geographical area or region (e.g., a city, country, etc.), a maximum allowed distance (e.g., physical straight-line distance) or radius from originating UE 109, and/or may be specified in some other way.

In some embodiments, the GTAG may indicate particular policies with respect to how to handle traffic. For example, the GTAG may include an index, identifier, etc. that corresponds to a particular policy. One example policy may indicate that a router that receives the traffic, and is outside of a geographical region in which the traffic is permitted to be propagated, should drop the traffic (e.g., not forward the traffic to a next "hop" or router in a route between originating UE 109 and a destination of the traffic). Another example policy may indicate that the router should establish an encrypted point-to-point connection between the router and the destination of the traffic, and forward the traffic via the encrypted point-to-point connection. In some embodiments, the encrypted point-to-point connection may be, or may include, a Virtual Private Network ("VPN") between the router and the destination of the traffic. In some embodiments, another example policy may indicate that the router, outside of the permissible geographical area, should encrypt or encapsulate the traffic. Yet another example policy may indicate that the router should send an alert or other type of message to originating UE 109, indicating that the traffic has been propagated outside of the permissible geographic area.

Assume, for this example, that the GTAG included in the traffic (at 102) indicates that the traffic is permitted to be propagated up to 2 kilometers ("km") from the location of originating UE 109. The GTAG may include, for example, the location of originating UE 109 (e.g., as expressed in terms of latitude and longitude coordinates or in some other suitable manner), and/or a unique identifier of originating UE 109, based on which the location of originating UE 109 may be determined. As further shown in FIG. 1, elements of local network 105 (e.g., router 103-1, router 103-2, and MEC 111) may be located within 1 km of originating UE 109. Accordingly, when receiving (at 102) the traffic with the GTAG, router 103-1 may determine that it is permissible (shown in the figure as "OK") to forward the traffic toward its destination.

In this example, assume that MEC 111 is a destination for at least a portion of the traffic. MEC 111 may be implemented by hardware resources that are proximate to (e.g., within 1 km of) originating UE 109. While not shown here, local network 105 may include multiple MECs 111 that are geographically distributed, such that MECs 111 may be at the "edge" of local network 105. In some embodiments, multiple MECs 111 may be or include the same or similar functionality (e.g., provide the same services), such that the user experience for UEs that access or communicate with different MECs 111 may be the same or similar. Further, while MEC 111 is shown in this example, in practice, other types of resources may be used. Since MEC 111 is a destination for at least a portion of the traffic, and further since router 103-1 has not determined that the traffic should be dropped based on the GTAG (and/or has determined that the traffic should not be dropped based on the GTAG), router 103-1 may forward (at 104) the appropriate portion of the traffic to MEC 111.

As one example, MEC 111 may provide computing/analysis services (e.g., image recognition, video postprocessing or transcoding, augmented reality, or the like), storage services (e.g., may store some or all of the received traffic for later retrieval or analysis), and/or other types of services for the received traffic. While not shown here, MEC 111 may output traffic to originating UE 109 in response to the received traffic, which may include traffic related to one or more services provided by MEC 111.

As further shown in FIG. 1, router 103-1 may forward (at 106) a portion of the traffic (received at 102 from originating UE 109) to router 103-2. For example, router 103-2 may be an edge router or some other router associated with local network 105, which is in the network path between originating UE 109 and the destination of the traffic. As further shown, MEC 111 may forward (at 108) some or all of the received traffic with the GTAG, and the forwarded traffic may also be received by router 103-2. For example, the forwarding (at 108) by MEC 111 may be the result of a configuration error or unexpected configuration (e.g., where MEC 111 has been configured to forward such traffic, but a user associated with originating UE 109 may not be aware of such configuration), a malicious attack (e.g., where MEC 111 has been "hacked" or accessed by an unauthorized party, such that MEC 111 or a network interface associated with MEC 111 forwards some or all of the traffic received by MEC 111), or some other situation. While discussed here in the terms of a configuration error or malicious attack, other situations may arise in which MEC 111 improperly forwards the received traffic.

In accordance with some embodiments, router 103-2 may determine whether to forward the traffic (received at 106 and/or 108), based on the GTAG. For example, as similarly described above, router 103-2 may determine whether router 103-2 is within a geographical area that is specified by the GTAG as a geographical area in which traffic may be forwarded by router 103-2. In this example, since the GTAG specifies a maximum propagation distance of 2 km, and router 103-2 is within 1 km of originating UE 109, router 103-2 may determine that the traffic (e.g., as received from router 103-1 and MEC 111) may be forwarded toward its destination. Accordingly, router 103-2 may forward (at 110) the traffic to the next hop in the route between originating UE 109 and the destination of the traffic.

In this example, the next hop may be router 103-3, which may be an edge router associated with external network 107. External network 107 may be, for example, an Internet backbone associated with an Internet Service Provider ("ISP") and/or some other type of network. As indicated in the figure, router 103-3 may be located 12 km away from router 103-2. Thus, when receiving (at 110) the traffic originally sent by originating UE 109, router 103-3 may determine, based on the GTAG included in the traffic, that router 103-3 is outside of the permissible propagation distance associated with the traffic, and may accordingly drop (at 112) the traffic. In this manner, the traffic outputted by originating UE 109, and marked with a GTAG limiting the propagation distance of the traffic to 2 km from originating UE 109, may not be propagated outside of the permissible geographic area indicated by the GTAG.

In some embodiments, in addition to, or in lieu of, evaluating whether a given router 103 is within the propagation distance indicated by a GTAG, the given router 103 may determine whether a "next hop" network device is within the propagation distance indicated by the GTAG. For example, some routing techniques include "awareness" of some or all of a network topology, in which a router at a given hop may maintain information associated with a next hop in the route (e.g., an identifier of the next hop). For example, referring again to FIG. 1, router 103-2 may receive or determine a location of router 103-3 (e.g., from GNF 101), and may determine that router 103-3 is outside of the propagation distance indicated by the GTAG. Accordingly, in lieu of forwarding (at 110) the traffic to router 103-3, router 103-2 may drop the traffic without forwarding the traffic to router 103-3.

As mentioned above, while FIG. 1 is described in the context of routers 103 determining whether to forward or drop traffic based on a GTAG, in practice, a GTAG policy may indicate one or more other actions to take. For example, router 103-3 may output an alert to originating UE 109 (e.g., using a "source" in header information associated with the received traffic, which may include an IP address or other identifier of originating UE 109), indicating that traffic marked with a GTAG was received by router 103-3.

Figure 2:
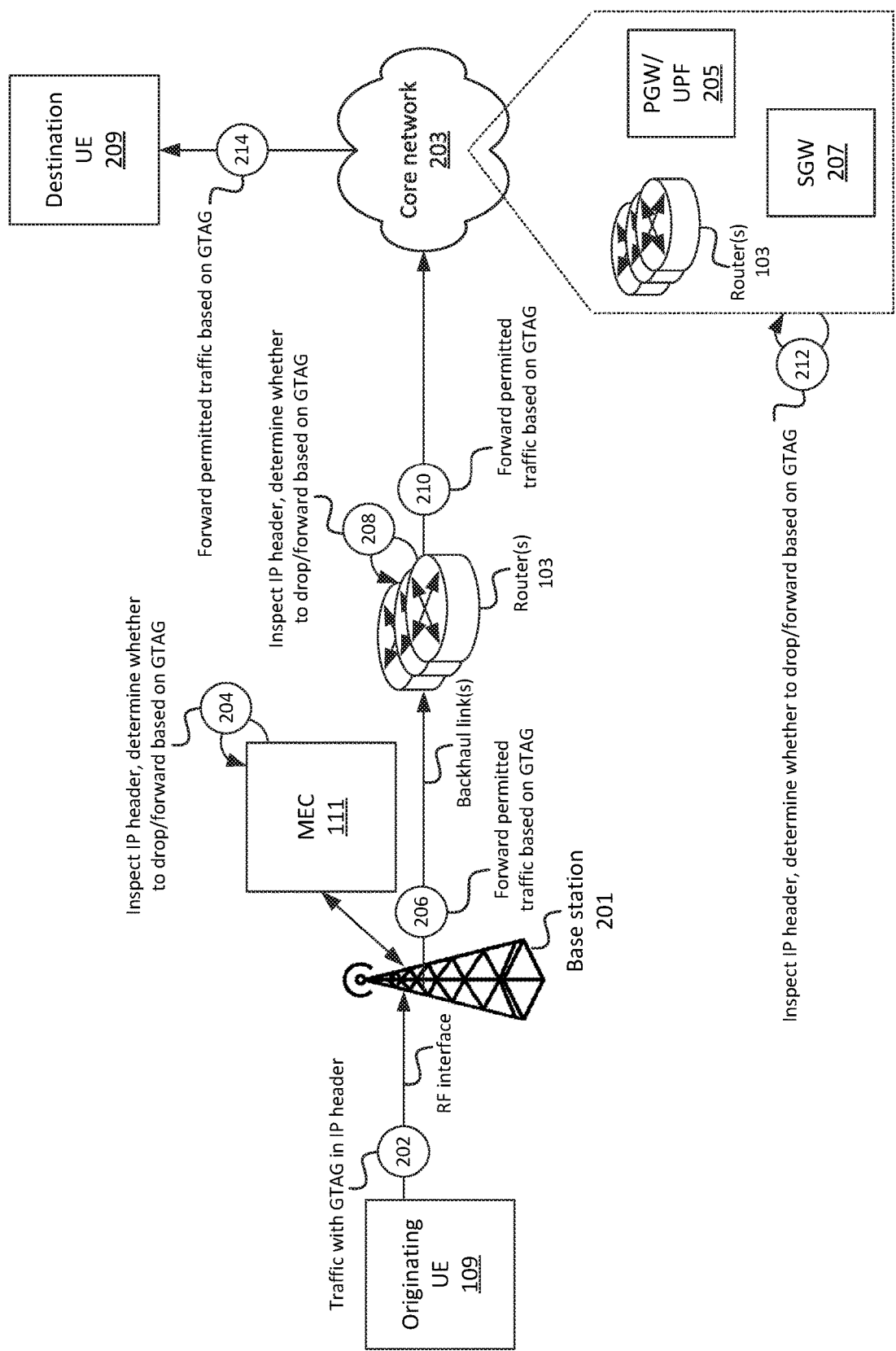
FIG. 2 illustrates an example overview of one or more embodiments described herein, in which routers associated with one or more wireless telecommunications networks may forward or drop the network traffic based on the GTAG.

FIG. 2 illustrates an example scenario, in a wireless telecommunications networking environment, in which GTAG policies may be applied to traffic from an originating UE 109. As shown, for example, originating UE 109 may be connected (e.g., via a radio frequency ("RF") interface) to base station 201, which may be a base station associated with a RAN of a wireless telecommunications network. Base station 201 may be, or may include, an evolved Node B ("eNB") associated with a Long-Term Evolution ("LTE") RAN, a Next Generation Node B ("gNB") associated with a Fifth Generation ("5G") RAN, and/or some other type of base station. As shown, base station 201 may be communicatively coupled to MEC 111. While not shown here, other base stations 201 (e.g., which may be geographically distributed) may be communicatively coupled to one or more other corresponding MECs 111.

As shown, originating UE 109 may output (at 202) traffic with a GTAG. For example, the traffic may include IP traffic with a GTAG in an IP header. In this example, base station 201 and MEC 111 may be configured such that MEC 111 inspects traffic received by base station 201 (e.g., via the RF interface provided by base station 201), determines whether to drop or forward the traffic based on a GTAG included in the traffic, and instructs base station 201 to drop or forward the traffic accordingly.

For example, MEC 111 may inspect (at 204) the traffic received (at 202) from originating UE 109. In this example, assume that MEC 111 determines (at 204) that the traffic is permitted to be forwarded. For example, as similarly described above, MEC 111 may determine that MEC 111 is within a propagation distance specified by the GTAG, that base station 201 is within the propagation distance, and/or that a next hop in the route between originating UE 109 and the destination of the traffic is within the propagation distance. In this example, the destination of the traffic (e.g., as indicated by a "destination" field in a header of the traffic) may be destination UE 209.

Accordingly, base station 201 may forward (at 206) the traffic, which is permitted to be forwarded based on the GTAG, toward its destination. For example, one or more backhaul links may communicatively couple base station 201 to core network 203. The backhaul links may include, for example, an Ethernet Backhaul ("EBH"), a Common Public Radio Interface ("CPRI") link, an Enhanced CPRI ("eCPRI") link, and/or some other suitable type of communication pathway between base station 201 and core network 203.

In some embodiments, the backhaul link(s) may include one or more routers 103. As similarly discussed above, some or all of these routers 103 may inspect (at 208) the received traffic, and determine whether to forward the traffic based on a GTAG included in the traffic. In this example, routers 103 may determine that some or all of the traffic is permissible to forward (based on the GTAG), and may accordingly forward (at 210) the traffic toward destination UE 209. Specifically, for example, routers 103, associated with the backhaul link(s), may forward (at 210) the traffic to core network 203.

As shown, core network 203 may include one or more devices, systems, Virtualized Network Functions ("VNFs"), etc. that process and/or forward traffic. For example, core network 203 may include one or more routers 103, Packet Data Network ("PDN") Gateway ("PGW") and/or User Plane Function ("UPF") 205 (referred to herein as "PGW/UPF 205"), Serving Gateway ("SGW") 207, and/or other devices, systems, or VNFs. These devices, systems, or VNFs associated with core network 203 may also selectively forward (at 212) the traffic based on the GTAG included in the traffic in a manner similarly described above.

Accordingly, in situations where the traffic is permitted to be forwarded based on the GTAG (e.g., where some or all of the devices, systems, or VNFs associated with core network 203 are within the propagation distance associated with the GTAG), core network 203 may forward (at 214) the traffic toward destination UE 209. While not shown here, one or more additional routers 103 may be in the route between core network 203 and destination UE 209, and may similarly evaluate the GTAG to determine whether to forward the traffic toward destination UE 209. While shown in the context of some or all of the traffic, sent by originating UE 109, as being permitted to be forwarded (e.g., where routers 103 are within the propagation distance specified by the GTAG), in other situations, one or more of these routers 103 or MEC 111 may determine that the traffic should be dropped, that originating UE 109 should be alerted, and/or that other GTAG policies should be applied.

Figure 3:
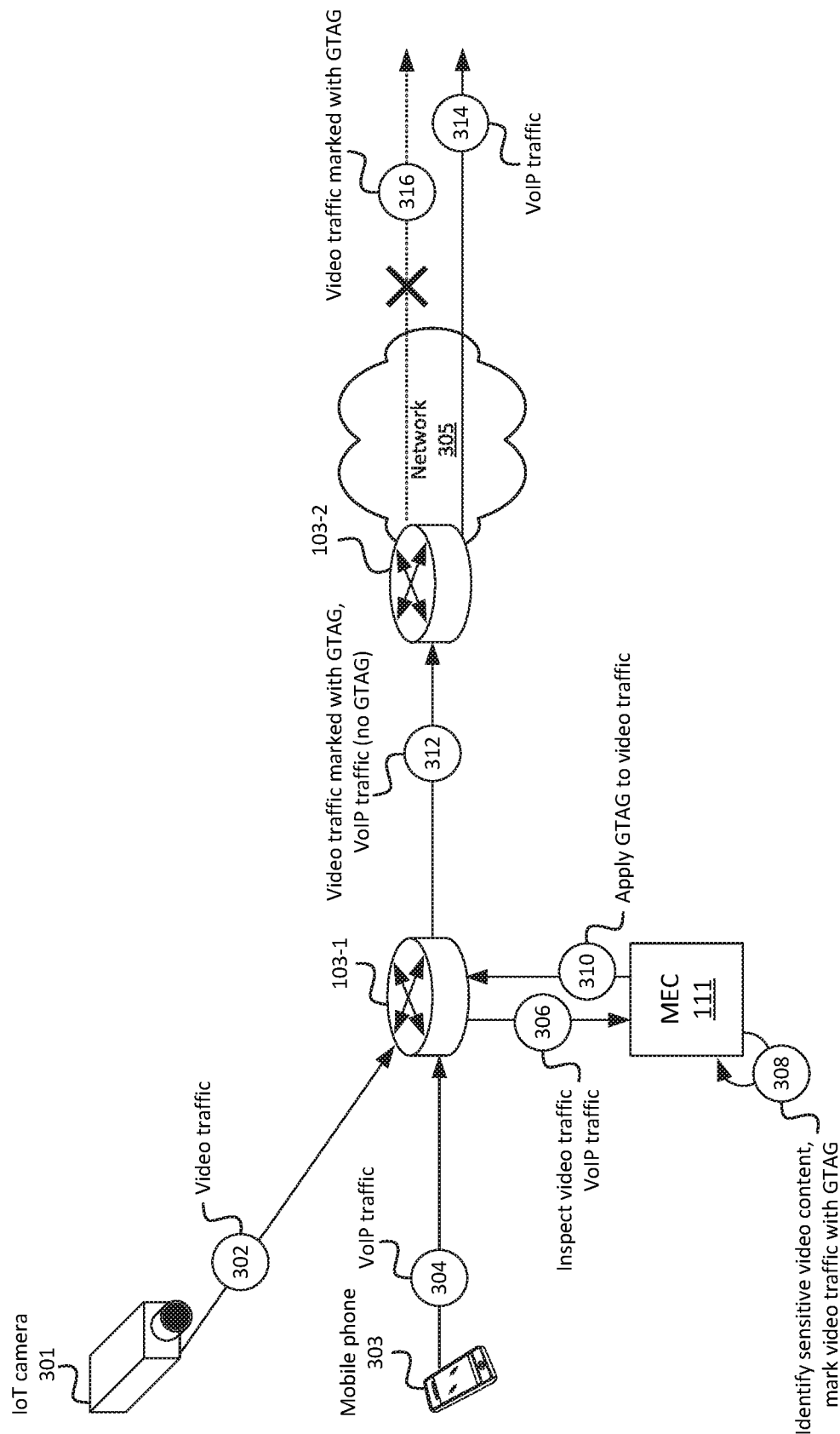
FIGS. 3 and 4 illustrate an example of an edge computing facility, such as a Multi-Access/Mobile Edge Computing device ("MEC"), selectively determining whether to apply a GTAG to particular traffic.
Figure 4:
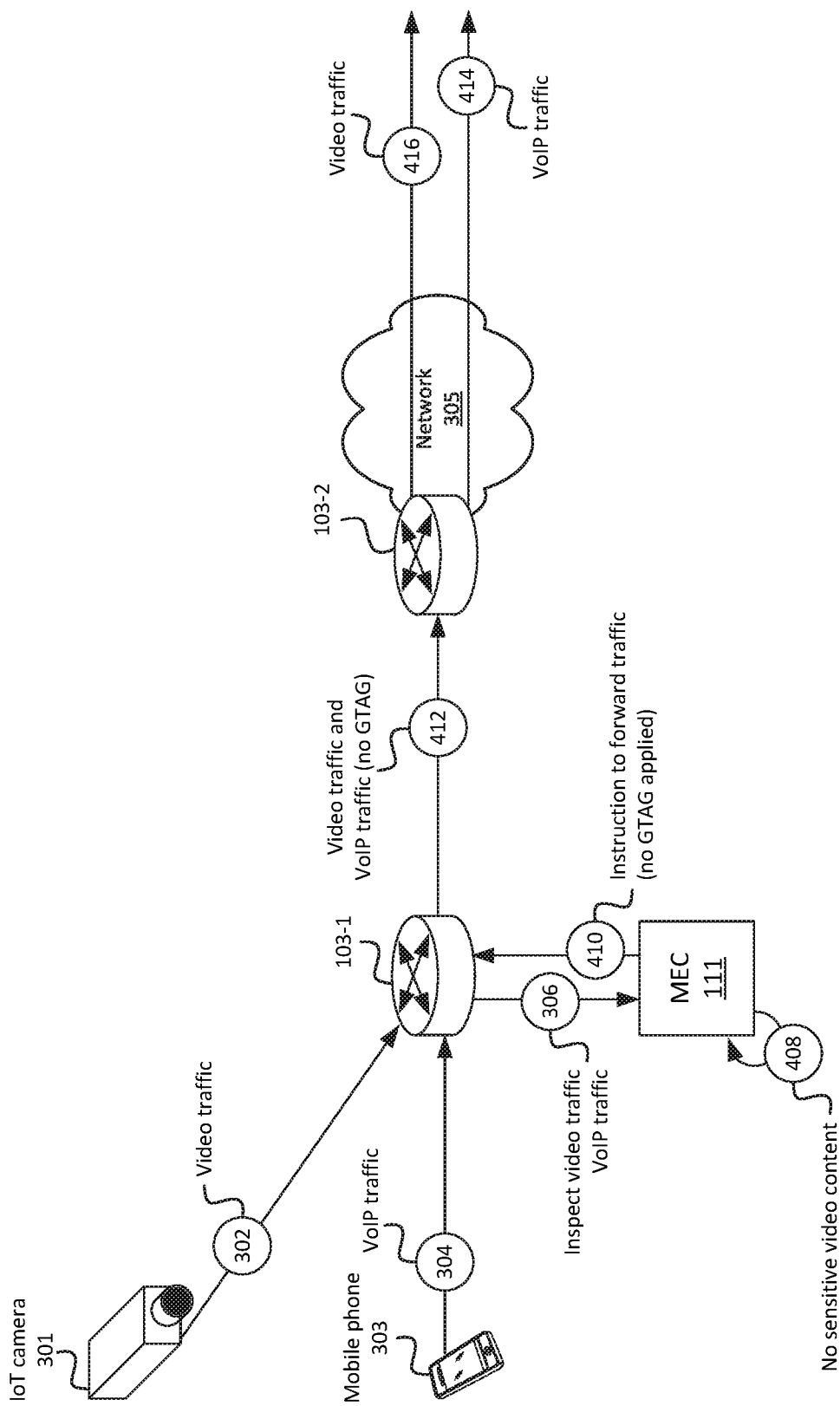

FIGS. 3 and 4 illustrate example scenarios in which MEC 111 may selectively apply a GTAG to traffic based on content of the traffic. For example, as shown in FIG. 3, a particular router 103-1 may receive traffic from two originating devices. For example, router 103-1 may receive (at 302) traffic from IoT camera 301, and may receive (at 304) traffic from mobile phone 303. The traffic from IoT camera 301 may include video content, and the traffic from mobile phone 303 may include Voice over IP ("VoIP") traffic.

The traffic from IoT camera 301 may include, for example, IP packets that include an encoded video stream, as well as metadata or other suitable information indicating an encoding-decoding scheme ("codec") associated with the video stream. As shown, router 103-1 may be communicatively coupled to MEC 111, which may inspect (at 306) the traffic received (at 302 and 304) by router 103-1. For example, MEC 111 may, by inspecting the traffic (received at 302) originating from IoT camera 301, determine that the traffic includes video content, and may further utilize the metadata or other suitable information to determine one or more codecs associated with the video content. Using the one or more codecs, MEC 111 may perform an image recognition analysis or other suitable analysis to identify objects, faces, etc. depicted in the video content.

MEC 111 may be configured to detect sensitive content in traffic, and mark such traffic with a GTAG to prevent propagation of the traffic over excessive distances (e.g., distances exceeding a threshold). For example, MEC 111 may receive such configuration from a user associated with IoT camera 301 and/or mobile phone 303, from an administrator associated with MEC 111, and/or from some other source. For example, MEC 111 may be associated with an API, a web portal, or some other suitable technique via which MEC 111 may receive and implement such configuration parameters.

In this example, MEC 111 may be configured to identify (at 308) sensitive content in the video content, such as faces of children, personal information (e.g., an address on an envelope, a bank account number on a bank statement, etc.), or other types of content indicated as sensitive. Accordingly, MEC 111 may mark (at 310) traffic that includes sensitive content (e.g., some or all of the traffic received from IoT camera 301) with a GTAG. For example, MEC 111 may place the GTAG in headers of IP packets that include a payload associated with the determined sensitive content.

In some embodiments, MEC 111 may mark (at 310) different types of traffic, or content included in traffic, with different GTAGs. For example, MEC 111 may specify different geographical regions depending on the type of content included in traffic (e.g., video content, voice call content, email content, etc.). As another example, MEC 111 may specify different geographical regions based on the type of sensitive content detected (e.g., faces of children, personal financial data, etc.).

In some embodiments, MEC 111 may specify different polices based on different types of content or types of sensitive content detected. For example, MEC 111 may specify (via a GTAG) that video content depicting faces of children should be dropped if received by a routing device outside of an indicated propagation distance, while MEC 111 may specify that an alert should be sent to an originating device when personal financial data is detected (but may potentially not specify that the traffic should be dropped based on propagation distance). While referred to as MEC 111 "marking" (at 310) traffic, in some embodiments, MEC 111 may instruct (at 310) router 103-1 to mark such traffic.

As further shown in FIG. 3, router 103-1 may forward (at 312) the VoIP traffic (received at 304) as well as the video traffic (marked with the GTAG at 310) toward an intended destination of the traffic. For example, an intended destination (e.g., as indicated in a "destination" head field) of the video traffic from IoT camera 301 may be an application server that provides a web portal for a user to view video content captured by IoT camera 301. Further, an intended destination of the VoIP traffic from mobile phone 303 may be a telephony application server ("TAS") that routes or forwards the VoIP traffic to another mobile phone 303, to one or more public switched telephone network ("PSTN") devices, and/or provides other call-related services.

The traffic (forwarded at 312) may be received by router 103-2, which may be an edge router associated with network 305. Network 305 may be, or may include, for example, an Internet backbone associated with an ISP, the Internet, and/or some other type of network. In this example, router 103-2 may forward (at 314) the VoIP traffic based on the absence of a GTAG. For example, router 103-2 may determine that no GTAG policies should be applied to the VoIP traffic because the VoIP traffic does not include a GTAG. On the other hand, router 103-2 may drop and/or otherwise refrain from forwarding (at 316) the video traffic, based on the GTAG. For example, router 103-2 may determine that router 103-2 is outside of a propagation distance specified by the GTAG, and/or that a next hop in the route is outside of the propagation distance.

FIG. 4 illustrates a similar scenario, except that MEC 111 may determine that the video content (from router 103) does not include sensitive information. Some of the signals in FIG. 4 are similar to those shown in FIG. 3 with the same reference numerals, and are not described again here for the sake of brevity.

As shown, for example, MEC 111 may inspect (at 306) video traffic and VoIP traffic received from IoT camera 301 and mobile phone 303 (at 302 and 304, respectively). As similarly discussed above, MEC 111 may analyze or inspect (at 306) the video traffic and may determine (at 408) that the video traffic does not include sensitive content (and/or may not determine that the video traffic includes sensitive content). Accordingly, MEC 111 may instruct (at 410) router 103-1 to forward the video traffic and the VoIP traffic toward their respective destinations, without applying a GTAG. As such, router 103-1 may forward (at 412) the video and VoIP traffic, which may be received by router 103-2. As the video traffic and the VoIP traffic do not include GTAGs, router 103-2 may forward (at 414 and 416) the VoIP traffic and the video traffic toward their respective destinations without applying any GTAG policies to the traffic.

Figure 5:
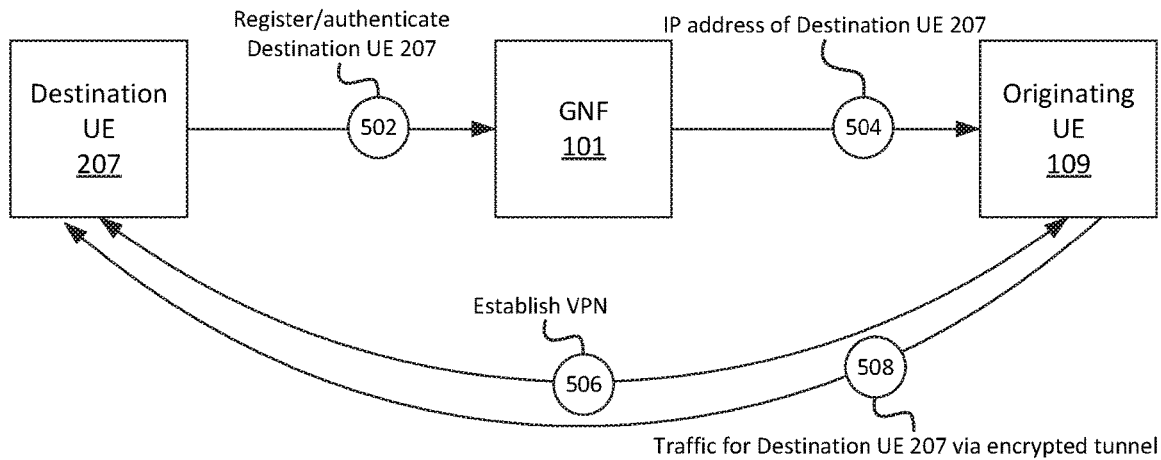
FIGS. 5-7 illustrate examples of embodiments in which a particular destination UE may be designated as an exception for traffic that includes a GTAG, based on which such traffic may be provided to the destination UE when the destination UE is located outside of a geofenced area indicated by the GTAG.
Figure 6:
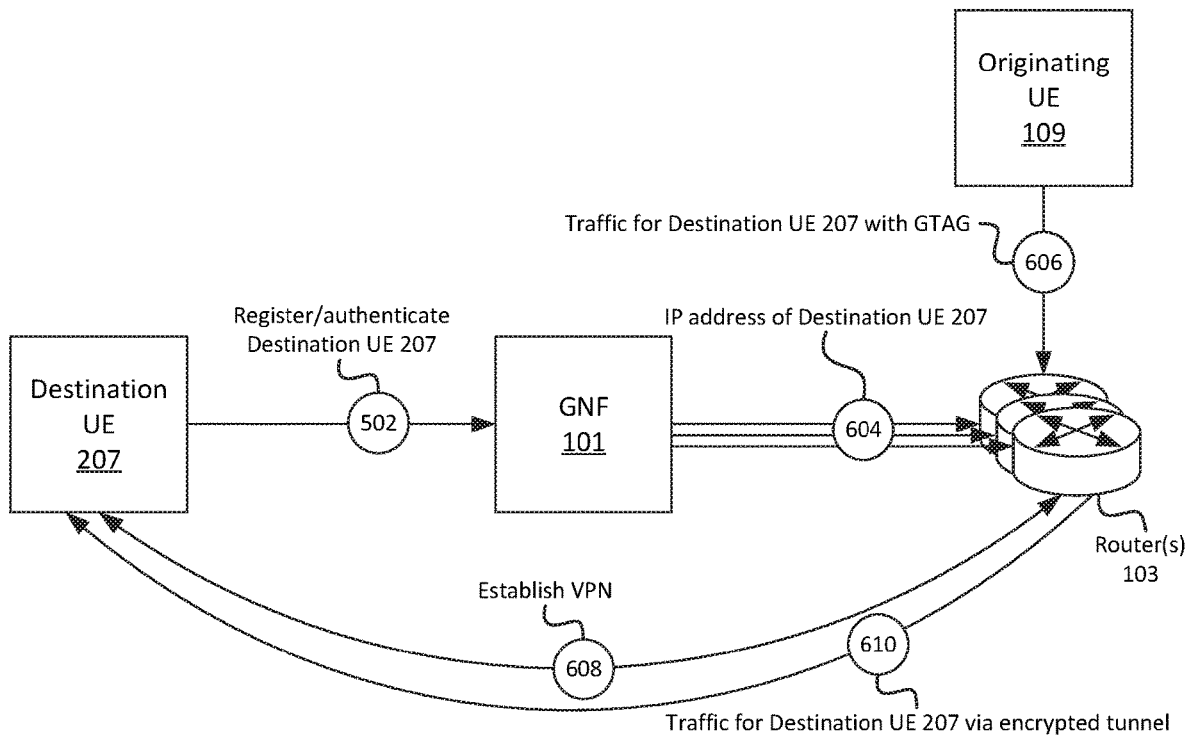
Figure 7:
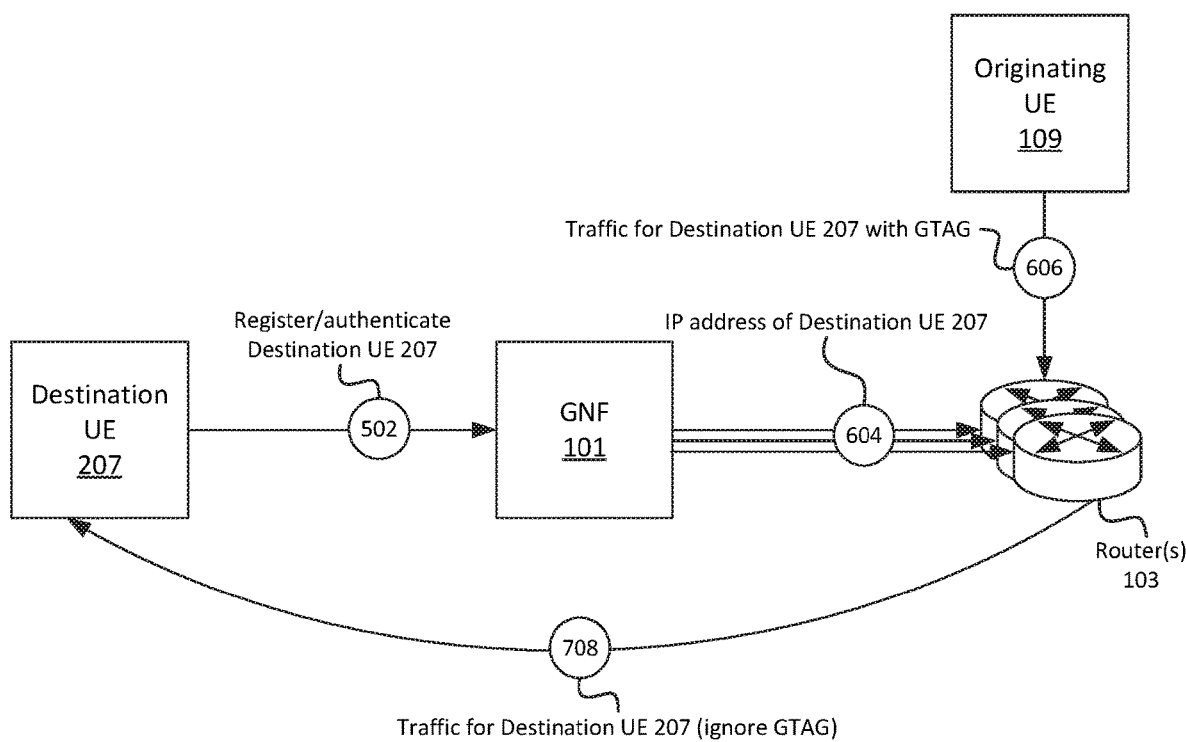

As shown in FIGS. 5-7, a particular destination UE 209 may register with GNF 101, such that traffic destined for destination UE 209 may be routed to destination UE 209, while potentially disregarding or not applying GTAG policies associated with traffic destined for destination UE 209. For example, as shown in FIG. 5, destination UE 209 may register (at 502) with GNF 101, which may include authenticating destination UE 209. For instance, destination UE 209 may be a device associated with a user who is authorized to receive traffic, including sensitive content, from originating UE 109, even if destination UE 209 is located relatively far away from originating UE 109. In one example, destination UE 209 may be a mobile phone, laptop computer, etc. associated with a user who is traveling, and wishes to access video content provided by originating UE 109 (e.g., where originating UE 109 is, or is communicatively coupled to, a networked camera).

GNF 101 may provide an API, a web portal, or some other suitable interface via which destination UE 209 may register (at 502) to receive traffic from originating UE 109, even if such traffic includes a GTAG and destination UE 209 is located outside of a propagation distance specified by the GTAG. In some embodiments, the registration may include authenticating destination UE 209, which may include confirming with originating UE 109 that destination UE 209 is authorized. For example, GNF 101 may output a request or notification to originating UE 109, indicating that destination UE 209 has requested to be registered as an exception for which GTAG policies should not be applied. GNF 101 may receive confirmation or other authorization from originating UE 109. In some embodiments, registering destination UE 209 may include GNF 101 receiving an IP address or other identifier of destination UE 209.

In some embodiments, GNF 101 may provide (at 504) the IP address of destination UE 209 to originating UE 109 (e.g., once destination UE 209 has been registered and/or authenticated). Using the IP address of destination UE 209 as provided by GNF 101, originating UE 109 and destination UE 209 may establish (at 506) an encrypted point-to-point tunnel connection (e.g., a VPN), via which originating UE 109 may output (at 508) traffic for destination UE 209. In this manner, routers 103 that are in a route between originating UE 109 and destination UE 209 may not have access to a GTAG in header information of the traffic (if such GTAG is applied), as the VPN may obscure such header information. In some embodiments, in lieu of establishing a VPN, originating UE 109 may refrain from marking traffic (destined for destination UE 209) with a GTAG.

FIG. 6 illustrates another example of destination UE 209 being registered as an exception for traffic marked with a GTAG. For example, destination UE 209 may register (at 502) with GNF 101. In some embodiments, the registration may be on the basis of destination UE 209 as a destination for traffic from any originating device, or on the basis of destination UE 209 as a destination for traffic from a particular originating device. For example, in the latter scenario, destination UE 209 may register as an exception for traffic from a particular originating UE 109. In some embodiments, for instance, GNF 101 may maintain account information associating one or more UEs (e.g., originating UE 109) with a particular account, and destination UE 209 may access the account information to register as an exception for GTAG-marked traffic from one or more devices associated with the particular account.

Once destination UE 209 has registered (at 502) with GNF 101, in this example, GNF 101 may propagate (at 604) the IP address of destination UE 209 to one or more routers 103. In some embodiments, while shown as a single GNF 101 outputting this information to a set of routers 103, in practice, multiple GNFs 101 may be deployed in a hierarchical manner, where a "master" GNF 101 outputs the information to lower tier GNFs 101, where such lower tier GNFs 101 may be associated with a discrete set of routers 103.

At some time after routers 103 have received the IP address of destination UE 209, a particular router 103 may receive (at 606) traffic for destination UE 209 from originating UE 109, which includes a GTAG. In some embodiments, the particular router 103 may determine, based on the GTAG, that the particular router 103 or a subsequent router 103 in a route between originating UE 109 and destination UE 209 is outside of a propagation distance indicated by the GTAG. Based on this determination, router 103 may establish (at 608) a VPN with destination UE 209, and provide (at 610) the traffic from originating UE 109 to destination UE 209 via the established VPN. In this manner, subsequent routers in the route between router 103 and destination UE 209 may not have access to the GTAG, and may accordingly not drop the traffic, even though such routers may be outside of the propagation distance specified by the GTAG.

FIG. 7 illustrates another example embodiment in which destination UE 209 may be registered as an exception for traffic marked with a GTAG. For example, as similarly discussed above with respect to FIGS. 5 and 6, destination UE 209 may register (at 502) with GNF 101, GNF 101 may provide (at 604) the IP address of destination UE 209 to one or more routers 103, and a particular router 103 may receive (at 606) traffic, marked with a GTAG, for destination UE 209. In accordance with some embodiments, based on the IP address of destination UE 209 (e.g., as indicated in a "destination" field of a header of such traffic), routers 103 may forward the traffic to destination UE 209, even if routers 103 are outside of the propagation distance indicated in the GTAG.

Figure 8:
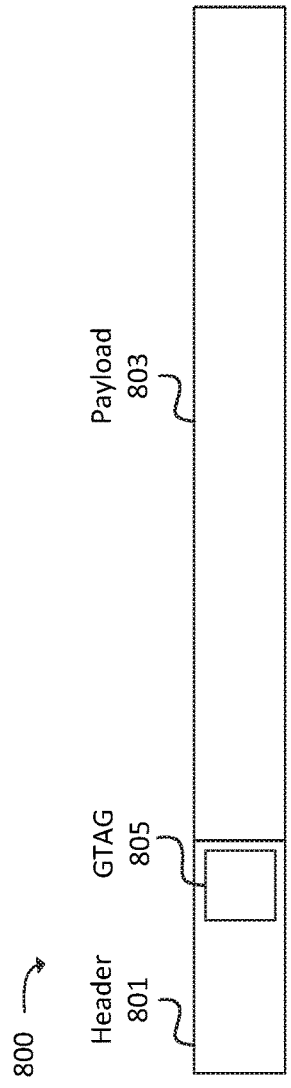
FIG. 8 illustrates an example arrangement of a packet that may include a GTAG in header information.

FIG. 8 illustrates an example packet 800, which may correspond to traffic that includes a GTAG. For example, as shown, packet 800 may include header 801 and payload 803. Payload 803 may include data relating to user content, such as video content, VoIP content, email content, messaging content, etc. Header 801 may include information suitable to route packet 800 (e.g., from an originating UE to a destination UE), to reconstruct the user content from multiple payloads 803 of multiple packets 800, protocol information, and/or other suitable information.

As further shown, header 801 may include GTAG 805. As mentioned above, GTAG 805 may indicate a geographic location of an originating device, a geographical region in which packet 800 may be propagated, a geographical region in which packet 800 may not be propagated, one or more IP addresses of devices for which a GTAG policy should be applied, one or more IP addresses of devices for which a GTAG policy should not be applied, etc.

In some embodiments, GTAG 805 may indicate a GTAG policy (e.g., how to handle packet 800 if packet 800 is received by, or forwarded to, router 103 or some other device that is outside of the permitted geographical region). For example, the GTAG policy may indicate that packet 800 should be dropped if received by router 103 that is outside of the geographical region, that packet 800 should be dropped by a particular router 103 if a next hop (or some other subsequent hop) is outside of the geographical region, that an originating device should be notified if packet 800 is dropped or received outside of the geographical region, that a destination device should be notified if packet 800 is dropped or received outside of the geographical region, or other suitable policies.

In some embodiments, different policies may apply to different originating and/or destination devices. For example, GTAG 805 may indicate that if a first device is a destination device for packet 800, then packet 800 should be dropped if received by a particular router 103 that is outside of a particular geographical region, whereas if a second device is a destination device for packet 800, then packet 800 should be forwarded to the second device regardless of whether a receiving router 103 is outside of the particular geographical region.

The information, included in GTAG 805 (e.g., the geographical region, policies, etc.), may be indicated by one or more indexes or other values. These indexes or values may be mapped to particular policies, geographic coordinates, regions, etc., such that suitable information may be indicated in GTAG 805 in a manner that is interpretable by routers 103. In some embodiments, routers 103 may maintain a mapping, lookup table, etc., via which routers 103 may determine particular policies or other information indicated by GTAG 805.

Figure 9:
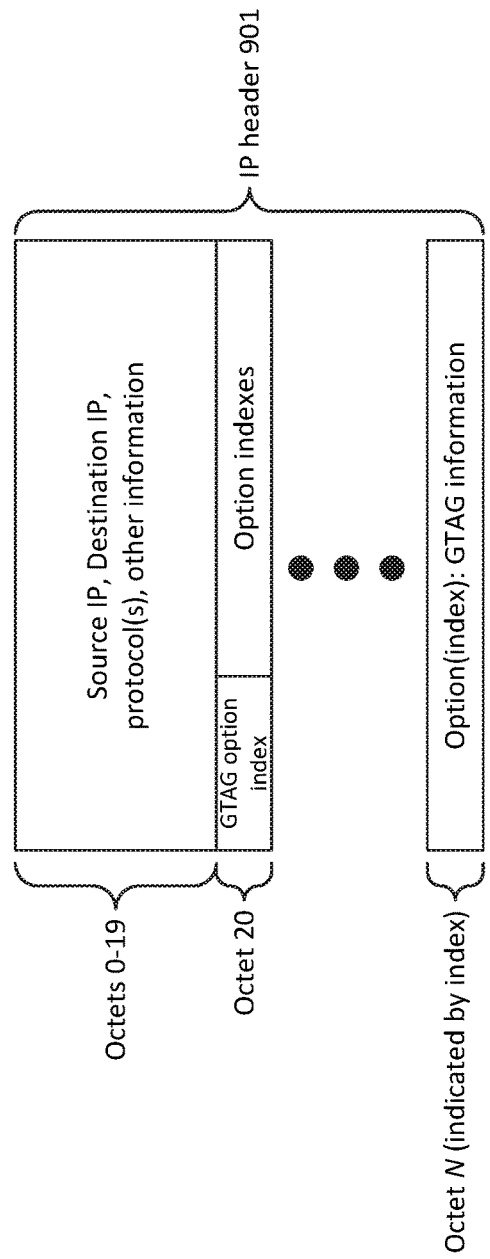
FIG. 9 illustrates an example arrangement of a header of a packet, in which a GTAG may be included.

FIG. 9 illustrates an example IP header 901, which may correspond to header 801 shown in FIG. 8, in some embodiments. As shown, IP header 901 may be arranged as a set of octets (e.g., sets of 8 bits), where each octet includes header information. In some embodiments, a first set of octets (e.g., 20 octets, shown in the figure as "Octets 0-19") may include header information such as a source IP address, a destination IP address, one or more protocols associated with a packet in which IP header 901 is included (e.g., packet 800), and/or other header information. In accordance with some embodiments, one or more additional octets may be used for "options," which may include information in addition to what is included in Octets 0-19.

For example, as shown, a twenty-first octet ("Octet 20") may include a set of option indexes, while additional octets (e.g., Octets 21 and up) may include "options" information. A particular option index (e.g., as included in Octet 20) may be a GTAG option index. The GTAG option index may indicate, for example, a particular octet (e.g., Octet N, in this example, where N is an integer greater than 20) that includes GTAG information. The GTAG option index may also indicate an option type (e.g., to denote that the "options" information at Octet N is GTAG information, as opposed to some other type of information). Further, the GTAG option index may indicate a length of the GTAG information, which may be specified in terms of number of bits, number of octets, or the like. As discussed above, the GTAG information (e.g., as stored at Octet N) may include values that denote a geographical region, geographical location of an originating device, one or more GTAG policies, etc.

While specific arrangements of packet 800 and IP header 901 are discussed above with respect to FIGS. 8 and 9, in practice, different arrangements are possible without departing from the concepts described above. For example, in some embodiments, different numbers of octets may be used for the information described with respect to FIG. 9.

Figure 10:
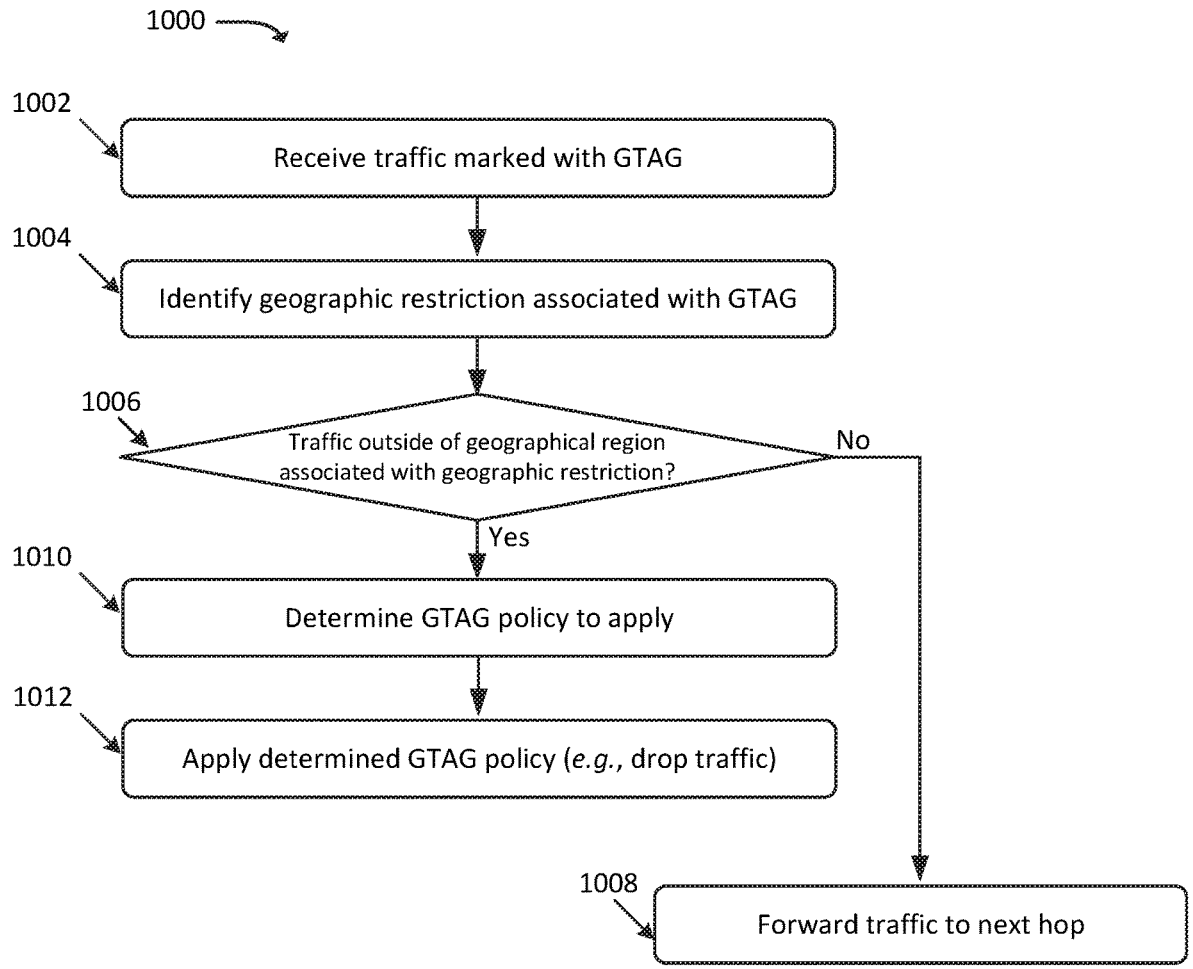
FIG. 10 illustrates an example process for applying a GTAG policy to traffic that is marked with a GTAG, in accordance with some embodiments.

FIG. 10 illustrates an example process 1000 for applying a GTAG policy to traffic that is marked with a GTAG. In some embodiments, some or all of process 1000 may be performed by a particular router 103. In some embodiments, one or more other devices may perform some or all of process 1000 in concert with, and/or in lieu of, router 103.

As shown, process 1000 may include receiving (at 1002) traffic that is marked with a GTAG. For example, as discussed above, router 103 may receive traffic, such as IP traffic, with a GTAG in one or more headers of the traffic, such as an IP header. Router 103 may be configured to detect the presence of a GTAG in received traffic messages.

Process 1000 may further include identifying (at 1004) a geographic restriction associated with the GTAG. For example, as discussed above, the GTAG may be inspected by router 103, and may be used to determine geographic region that should be used to restrict the propagation of the marked traffic. In some embodiments, the geographical region may be specified as a maximum propagation distance for the traffic from the originating device. In some embodiments, the maximum propagation distance may be expressed in absolute terms (e.g., a particular geographical region in which the traffic is permitted to be propagated, and/or a particular geographical region in which the traffic is not permitted to be propagated).

Process 1000 may additionally include determining (at 1006) whether the traffic is (or will be) outside of the geographical region associated with the GTAG. For example, router 103 may determine whether router 103 itself is outside of the geographical region associated with the GTAG, whether a next hop is outside of the geographical region, and/or whether a subsequent hop is outside of the geographical region. For example, router 103 may receive (e.g., from GNF 101 or some other suitable device or system) information indicating a location or router 103, and/or router 103 may include location determination functionality (e.g., Global Positioning System ("GPS") circuitry and/or other suitable circuitry and/or logic) to determine its own location. In some embodiments, router 103 may determine a location of a next hop in a route between the originating device and the destination device, and/or a location of a subsequent hop (e.g., after the next hop).

In some embodiments, as discussed above, the GTAG may include one or more GTAG policies, which may indicate the particular criteria that router 103 may use. For example, one GTAG policy may indicate that the criteria for determining whether the traffic is outside of the geographical region is based on the location of router 103, while another GTAG policy may indicate that the criteria for determining whether the traffic is outside of the geographical region is based on the location of the next hop after router 103. If the traffic is not outside of the geographical region (at 1006—NO), then process 1000 may also forwarding (at 1008) the traffic to the next hop.

If, on the other hand, the traffic is outside of the geographical region (at 1006—YES), then process 1000 may further include determining (at 1010) a particular GTAG policy to apply. For example, as discussed above, the traffic may include a particular GTAG policy, that indicates how to handle traffic that is outside of the geographical region (e.g., drop the traffic, notify the originating and/or destination devices, or perform other suitable actions). Process 1000 may additionally include applying (at 1012) the determined GTAG policy. For example, router 103 may drop the traffic, notify the originating and/or destination devices, etc.).

Figure 11:
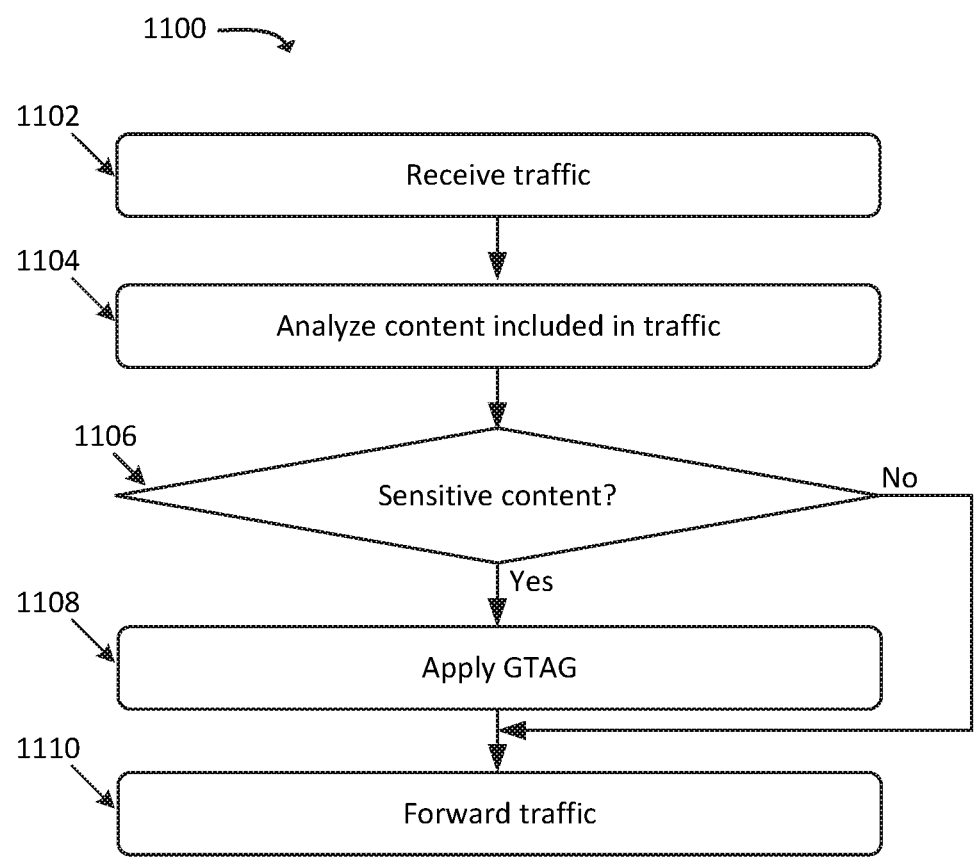
FIG. 11 illustrates an example process for selectively applying a GTAG to traffic that includes sensitive content, in accordance with some embodiments.

FIG. 11 illustrates an example process 1100 for selectively applying a GTAG to traffic that includes sensitive content. In some embodiments, some or all of process 1100 may be performed by MEC 111 (e.g., a particular MEC 111 that is communicatively coupled to a particular router 103 and/or some other device or system that receives and/or forwards traffic). In some embodiments, one or more other devices may perform some or all of process 1100 in concert with, and/or in lieu of, MEC 111. For example, some or all of process 1100 may be performed by originating UE 109.

As shown, process 1100 may include receiving (at 1102) traffic. For example, MEC 111 may receive traffic sent from an originating device, and/or may receive an indication (e.g., from router 103 or some other device that is communicatively coupled to MEC 111) that traffic has been received.

Process 1100 may further include analyzing (at 1104) content included in the traffic. For example, MEC 111 may analyze payloads of received packets to identify content that is carried by such packets. As discussed above, such content may include video content, voice call content, email content, and/or other content. MEC 111 may, in some embodiments, implement codecs and/or other suitable techniques to decipher, interpret, analyze, etc. the content included in the traffic. MEC 111 may utilize pattern recognition techniques, machine learning techniques, Natural Language Processing ("NLP") techniques, image recognition techniques, or other suitable techniques to analyze the content.

Process 1100 may additionally include determining (at 1106) whether the content includes sensitive content. For example, as discussed above, MEC 111 may be configured (e.g., by an originating device, an operator associated with MEC 111, etc.) to identify certain types of content designated as "sensitive." For example, based on the analysis, MEC 111 may identify video content with children's faces or sensitive personal information (e.g., papers or computer screens with sequences of numbers, which may correlate to account numbers, financial data, etc.), image content with health-related data (e.g., X-rays or other imaging, prescriptions, or the like), and/or other sensitive data.

If the traffic includes sensitive content (at 1106—YES), then process 1100 may also include applying (at 1108) a GTAG to the traffic. For example, MEC 111 may add or modify header information (e.g., IP header information) to include a GTAG, which may restrict the physical distance that the traffic can traverse and/or may indicate other policies (e.g., outputting alerts when the traffic has traversed a threshold distance or has been propagated outside of a particular geographical area). As discussed above, different types of sensitive information may be associated with different GTAG policies.

Process 1100 may further include forwarding (at 1110) the traffic. For example, the traffic may be forwarded with the GTAG (applied at 1108), or without a GTAG if the traffic does not include sensitive information (at 1106—NO). As discussed above, routers 103 that receive the traffic may apply policies indicated by the GTAG (e.g., forward or drop the traffic, output alerts, etc.).

Figure 12:
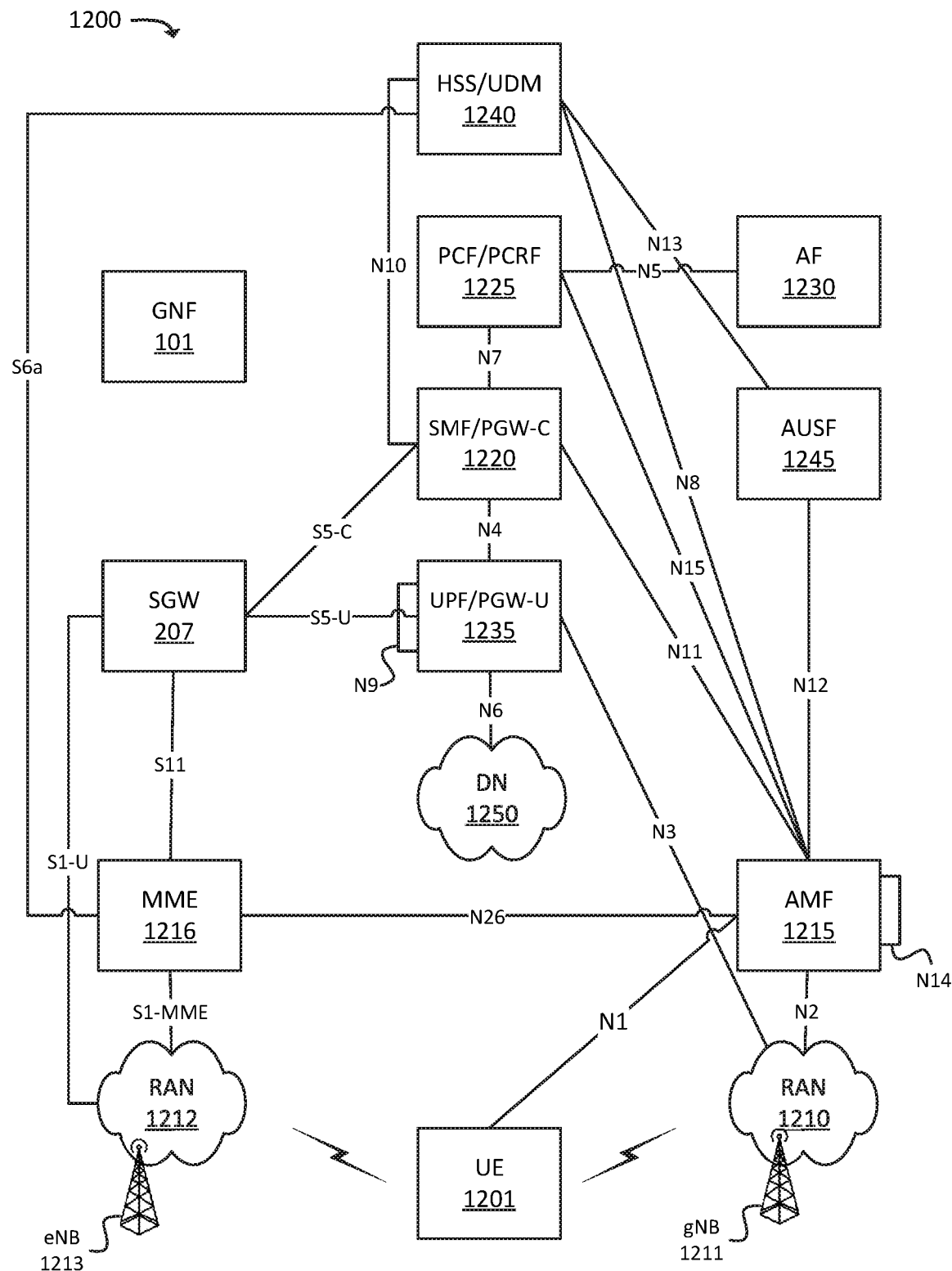
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a Fifth Generation ("5G") network, and/or may include elements of a 5G network. In some embodiments, environment 1200 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 1200 may include UE 1201, RAN 1210 (which may include one or more gNBs 1211), RAN 1212 (which may include one or more one or more evolved Node Bs eNBs 1213), and various network functions such as Access and Mobility Management Function ("AMF") 1215, Mobility Management Entity ("MME") 1216, SGW 207, Session Management Function ("SMF")/PGW-Control plane function ("PGW-C") 1220, Policy Control Function ("PCF")/Policy Charging and Rules Function ("PCRF") 1225, Application Function ("AF") 1230, UPF/PGW-User plane function ("PGW-U") 1235, Home Subscriber Server ("HSS")/Unified Data Management ("UDM") 1240, Authentication Server Function ("AUSF") 1245, and GNF 101. As further shown, environment 1200 may include one or more networks, such as Data Network ("DN") 1250.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers 103, modems, gateways, switches, hubs, etc. Alternatively, or additionally, one or more of the devices of environment 1200 may perform one or more network functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

UE 1201 may include a computation and communication device, such as a wireless mobile communication device that is capable of communicating with RAN 1210 and/or DN 1250. UE 1201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 1201 may send traffic to and/or receive traffic (e.g., user plane traffic) from DN 1250 via RAN 1210 and UPF/PGW-U 1235. In some embodiments, originating UE 109, destination UE 209, IoT camera 301, and mobile phone 303 may be instances of UE 1201, and/or may be communicatively coupled to one or more UEs 1201.

RAN 1210 may be, or may include, a 5G RAN that includes one or more base stations (e.g., one or more gNBs 1211), via which UE 1201 may communicate with one or more other elements of environment 1200. UE 1201 may communicate with RAN 1210 via an air interface (e.g., as provided by gNB 1211). For instance, RAN 1210 may receive traffic (e.g., voice call traffic, data traffic, messaging traffic, signaling traffic, etc.) from UE 1201 via the air interface, and may communicate the traffic to UPF/PGW-U 1235, and/or one or more other devices or networks. Similarly, RAN 1210 may receive traffic intended for UE 1201 (e.g., from UPF/PGW-U 1235, AMF 1215, and/or one or more other devices or networks) and may communicate the traffic to UE 1201 via the air interface.

RAN 1212 may be, or may include, an LTE RAN that includes one or more base stations (e.g., one or more eNBs 1213), via which UE 1201 may communicate with one or more other elements of environment 1200. UE 1201 may communicate with RAN 1212 via an air interface (e.g., as provided by eNB 1213). For instance, RAN 1210 may receive traffic (e.g., voice call traffic, data traffic, messaging traffic, signaling traffic, etc.) from UE 1201 via the air interface, and may communicate the traffic to UPF/PGW-U 1235, and/or one or more other devices or networks. Similarly, RAN 1210 may receive traffic intended for UE 1201 (e.g., from UPF/PGW-U 1235, SGW 209, and/or one or more other devices or networks) and may communicate the traffic to UE 1201 via the air interface.

AMF 1215 may include one or more devices, systems, VNFs, etc., that perform operations to register UE 1201 with the 5G network, to establish bearer channels associated with a session with UE 1201, to hand off UE 1201 from the 5G network to another network, to hand off UE 1201 from the other network to the 5G network, manage mobility of UE 1201 between RANs 1210 and/or gNBs 1211, and/or to perform other operations. In some embodiments, the 5G network may include multiple AMFs 1215, which communicate with each other via the N14 interface (denoted in FIG. 12 by the line marked "N14" originating and terminating at AMF 1215).

MME 1216 may include one or more devices, systems, VNFs, etc., that perform operations to register UE 1201 with the EPC, to establish bearer channels associated with a session with UE 1201, to hand off UE 1201 from the EPC to another network, to hand off UE 1201 from another network to the EPC, manage mobility of UE 1201 between RANs 1212 and/or eNBs 1213, and/or to perform other operations.

SGW 209 may include one or more devices, systems, VNFs, etc., that aggregate traffic received from one or more eNBs 1213 and send the aggregated traffic to an external network or device via UPF/PGW-U 1235. Additionally, SGW 209 may aggregate traffic received from one or more UPF/PGW-Us 1235 and may send the aggregated traffic to one or more eNBs 1213. SGW 209 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, etc., that gather, process, store, and/or provide information in a manner described herein. SMF/PGW-C 1220 may, for example, facilitate in the establishment of communication sessions on behalf of UE 1201. In some embodiments, the establishment of communications sessions may be performed in accordance with one or more policies provided by PCF/PCRF 1225.

PCF/PCRF 1225 may include one or more devices, systems, VNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, etc., that receive, store, and/or provide information that may be used in determining parameters (e.g., quality of service parameters, charging parameters, or the like) for certain applications.

UPF/PGW-U 1235 may include one or more devices, systems, VNFs, etc., that receive, store, and/or provide data (e.g., user plane data). For example, UPF/PGW-U 1235 may receive user plane data (e.g., voice call traffic, data traffic, etc.), destined for UE 1201, from DN 1250, and may forward the user plane data toward UE 1201 (e.g., via RAN 1210, SMF/PGW-C 1220, and/or one or more other devices). In some embodiments, multiple UPFs 1235 may be deployed (e.g., in different geographical locations), and the delivery of content to UE 1201 may be coordinated via the N9 interface (e.g., as denoted in FIG. 12 by the line marked "N9" originating and terminating at UPF/PGW-U 1235). Similarly, UPF/PGW-U 1235 may receive traffic from UE 1201 (e.g., via RAN 1210, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

HSS/UDM 1240 and AUSF 1245 may include one or more devices, systems, VNFs, etc., that manage, update, and/or store, in one or more memory devices associated with AUSF 1245 and/or HSS/UDM 1240, profile information associated with a subscriber. AUSF 1245 and/or HSS/UDM 1240 may perform authentication, authorization, and/or accounting operations associated with the subscriber and/or a communication session with UE 1201.

DN 1250 may include one or more wired and/or wireless networks. For example, DN 1250 may include an Internet Protocol ("IP")-based PDN, a wide area network ("WAN") such as the Internet, a private enterprise network, and/or one or more other networks. UE 1201 may communicate, through DN 1250, with data servers, other UEs 1201, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 1201 may communicate.

GNF 101 may include one or more devices, systems, VNFs, etc., that perform one or more operations described above. While no connections are shown between GNF 101 and other elements of environment 1200, GNF 101 may be communicatively coupled to some or all of the devices, systems, VNFs, etc. depicted in FIG. 12. In some embodiments, as mentioned above, environment 1200 may include one or more routers 103 that serve to route traffic to, from, or between the elements shown in FIG. 12. GNF 101 may be communicatively coupled to some or all of such routers 103, in order to perform the operations described herein.

Figure 13:
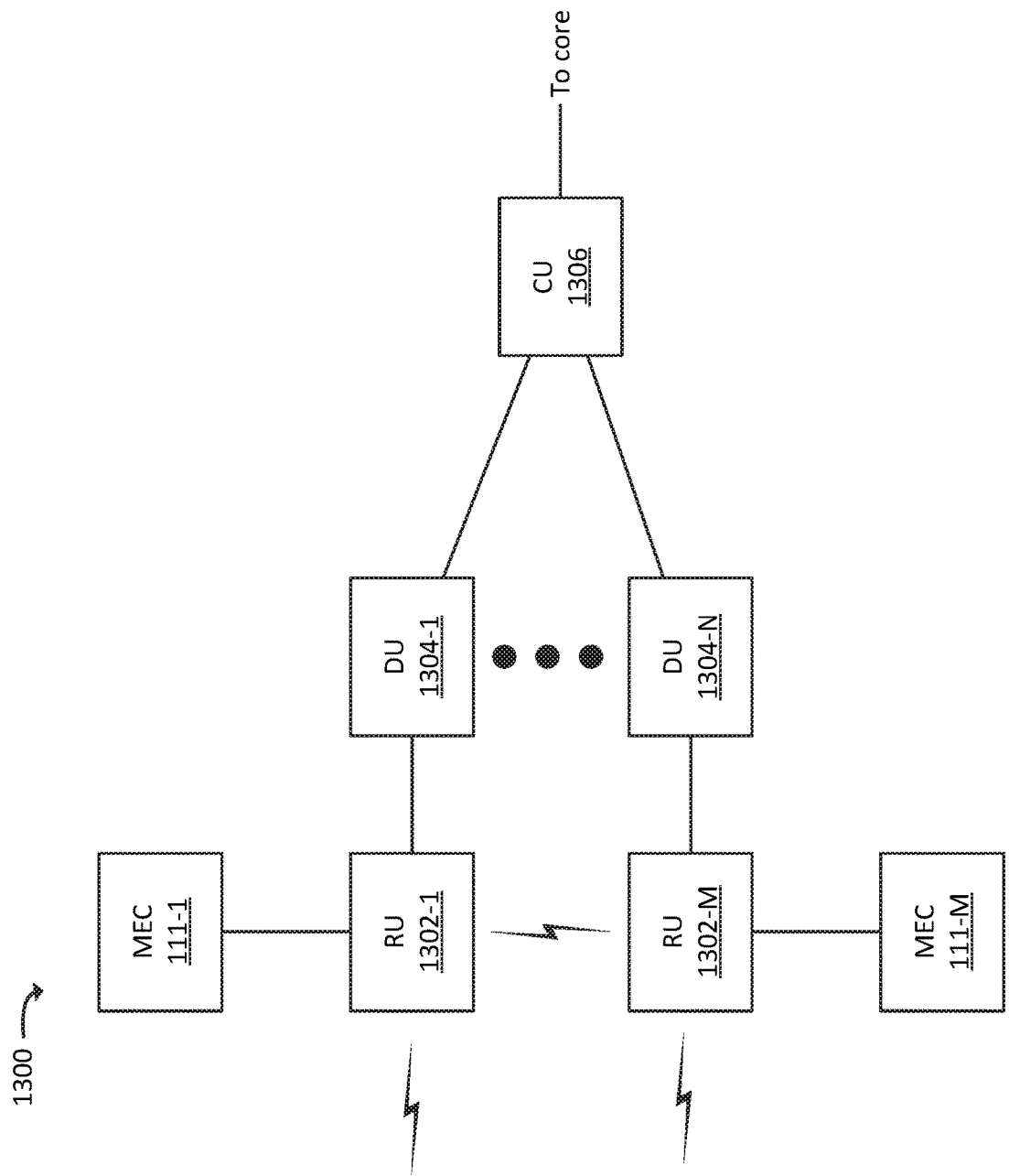
FIG. 13 illustrates an example arrangement of a radio access network ("RAN"), in accordance with some embodiments.

FIG. 13 illustrates an example Distributed Unit ("DU") network 1300, which may be included in and/or implemented by one or more RANs (e.g., RAN 1210). In some embodiments, a particular RAN may include one DU network 1300. In some embodiments, a particular RAN may include multiple DU networks 1300. In some embodiments, DU network 1300 may correspond to a particular gNB 1211 of a 5G RAN (e.g., RAN 1210). In some embodiments, DU network 1300 may correspond to multiple gNBs 1211. In some embodiments, DU network 1300 may correspond to one or more other types of base stations of one or more other types of RANs. As shown, DU network 1300 may include Control Unit ("CU") 1305, one or more Distributed Units ("DUs") 1303-1 through 1303-N (referred to individually as "DU 1303," or collectively as "DUs 1303"), and one or more Remote Units ("RUs") 1301-1 through 1301-M (referred to individually as "RU 1301," or collectively as "RUs 1301").

CU 1305 may communicate with a core of a wireless network (e.g., may communicate with one or more of the devices or systems described above with respect to FIG. 12, such as AMF 1215 and/or UPF/PGW-U 1235). In the uplink direction (e.g., for traffic from UEs 1201 to a core network), CU 1305 may aggregate traffic from DUs 1303, and forward the aggregated traffic to the core network. In some embodiments, CU 1305 may receive traffic according to a given protocol (e.g., Radio Link Control ("RLC")) from DUs 1303, and may perform higher-layer processing (e.g., may aggregate/process RLC packets and generate Packet Data Convergence Protocol ("PDCP") packets based on the RLC packets) on the traffic received from DUs 1303.

In accordance with some embodiments, CU 1305 may receive downlink traffic (e.g., traffic from the core network) for a particular UE 1201, and may determine which DU(s) 1303 should receive the downlink traffic. DU 1303 may include one or more devices that transmit traffic between a core network (e.g., via CU 1305) and UE 1201 (e.g., via a respective RU 1301). DU 1303 may, for example, receive traffic from RU 1301 at a first layer (e.g., physical ("PHY") layer traffic, or lower PHY layer traffic), and may process/aggregate the traffic to a second layer (e.g., upper PHY and/or RLC). DU 1303 may receive traffic from CU 1305 at the second layer, may process the traffic to the first layer, and provide the processed traffic to a respective RU 1301 for transmission to UE 1201.

RU 1301 may include hardware circuitry (e.g., one or more RF transceivers, antennas, radios, and/or other suitable hardware) to communicate wirelessly (e.g., via an RF interface) with one or more UEs 1201, one or more other DUs 1303 (e.g., via RUs 1301 associated with DUs 1303), and/or any other suitable type of device. In the uplink direction, RU 1301 may receive traffic from UE 1201 and/or another DU 1303 via the RF interface and may provide the traffic to DU 1303. In the downlink direction, RU 1301 may receive traffic from DU 1303, and may provide the traffic to UE 1201 and/or another DU 1303.

RUs 1301 may, in some embodiments, be communicatively coupled to one or more MECs 111. For example, RU 1301-1 may be communicatively coupled to MEC 111-1, RU 1301-M may be communicatively coupled to MEC 111-M, and so on. MECs 111 may include hardware resources (e.g., configurable or provisionable hardware resources) that may be configured to provide services and/or otherwise process traffic to and/or from UE 1201, via a respective RU 1301. For example, RU 1301 may route some traffic, from UE 1201, to MEC 111 instead of to a core network (e.g., via DU 1303 and CU 1305). MEC 111 may process the traffic, perform one or more computations based on the received traffic, and may provide traffic to UE 1201 via an associated RU 1301. In this manner, ultra-low latency services may be provided to UE 1201, as traffic does not need to traverse DU 1303, CU 1305, and an intervening backhaul network between DU network 1300 and the core network.

Figure 14:
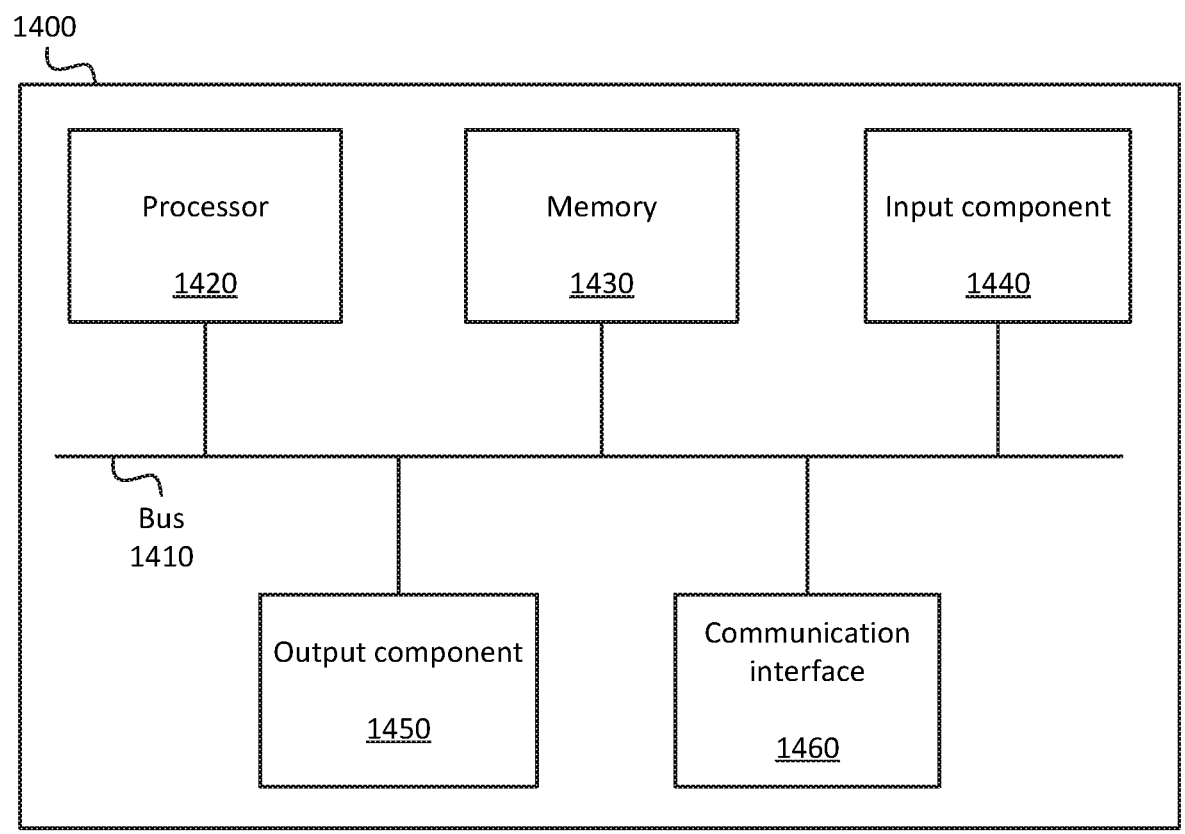
FIG. 14 illustrates example functional components of one or more devices, in accordance with one or more embodiments described herein.

FIG. 14 illustrates example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7, 10, and 11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

For example, while discussed in the context of IP traffic and IP headers, in some embodiments, traffic may use one or more other protocols in addition to, or in lieu of, IP (e.g., Hypertext Transfer Protocol ("HTTP"), application-layer protocols or messaging, etc.). In such embodiments, the GTAG may be in header data, metadata, or other data associated with the one or more other protocols (e.g., an HTTP header or some other header).

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
   a first network device configured to:
     receive network traffic including an indication of a destination, the network traffic having been output by originating device;
     identify geographic restriction information included in the network traffic, the geographic restriction information indicating that a geographical restriction is applicable to the traffic, wherein the particular geographical region associated with the geographic restriction includes a maximum allowed distance from a geographical location associated with the originating device;
     determine a particular geographical region, based on the maximum allowed distance from the geographical location associated with the originating device, in which the traffic is permitted to be propagated;
     determine that a first geographical location of the first network device is within the particular geographical region associated with the geographical restriction;
     forward, based on determining that the first geographical location of the first network device is within the particular geographical region associated with the geographical restriction, the network traffic to a second network device that is on a network path between the first network device and the destination; and
   the second network device, wherein the second network device is configured to:
     receive the network traffic from the first network device;
     determine that a second geographical location of the second network device is outside of the particular geographical region associated with the geographical restriction; and
     perform one or more actions based on determining that the second geographical location of the second network device is outside of the particular geographical region associated with the geographic restriction, wherein the one or more actions include at least one of:
       dropping the network traffic in lieu of forwarding the network traffic toward the destination,
       outputting an alert to a source of the network traffic, or outputting an alert to the destination of the network traffic.

2. The system of claim 1, wherein the network traffic is first network traffic, wherein the first network device is further configured to:
receive second network traffic;
identify that the second network traffic does not include the geographic restriction information; and
forward the second network traffic to a destination associated with the second network traffic based on identifying that the second network traffic does not include the geographic restriction information.

3. The system of claim 1, wherein the geographic restriction information is located in a header of an Internet Protocol ("IP") message of the network traffic.

4. The system of claim 3, wherein the geographic restriction information is located in an options field of the header of the IP message.

5. The system of claim 1, wherein the geographic restriction information includes at least one of:
an indication of the geographical location associated with the originating device, or
an index to a data store from which the geographical location associated with the originating device is available to be retrieved.

6. The system of claim 1, wherein the particular geographical region associated with the geographic restriction is further indicated as a set of geographical coordinates defining the particular geographical region.

7. The system of claim 1, wherein the geographic restriction information further indicates a policy, the policy indicating the one or more actions to perform based on the determination that the geographical location, associated with the second network device, is outside of the particular geographical region associated with the geographic restriction.

8. The system of claim 1, wherein the network traffic was sent from the originating device to an intervening device,
wherein the geographic restriction information has been added to the network traffic by the intervening device based on an analysis, by the intervening device, of payload information associated with the network traffic,
wherein the network traffic, including the added geographic restriction information, is received from the intervening device.

9. A method, comprising:
receiving, by a first network device, network traffic including an indication of a destination, the network traffic having been output by an originating device;
identifying, by the first network device, geographic restriction information included in the network traffic, the geographic restriction information indicating that a geographical restriction is applicable to the traffic, wherein the particular geographical region associated with the geographic restriction includes a maximum allowed distance from a geographical location associated with the originating device;
determining, by the first network device, a particular geographical region, based on the maximum allowed distance from the geographical location associated with the originating device, in which the traffic is permitted to be propagated;
determining, by the first network device, that a first geographical location of the first network device is within the particular geographical region associated with the geographical restriction;

forwarding, by the first network device and based on determining that the first geographical location of the first network device is within the particular geographical region associated with the geographical restriction, the network traffic to a second network device that is on a network path between the first network device and the destination;
determining, by the second network device, that a second geographical location of the second network device is outside of the particular geographical region associated with the geographical restriction; and
performing, by the second network device, one or more actions based on determining that the second geographical location of the second network device is outside of the particular geographical region associated with the geographic restriction, wherein the one or more actions include at least one of:
dropping the network traffic in lieu of forwarding the network traffic toward the destination,
outputting an alert to a source of the network traffic, or
outputting an alert to the destination of the network traffic.

10. The method of claim 9, wherein the network traffic is first network traffic, the method further comprising:
receiving second network traffic;
identifying that the second network traffic does not include geographical restriction information; and
forwarding the second network traffic to a destination associated with the second network traffic based on identifying that the second network traffic does not include geographic restriction information.

11. The method of claim 9, wherein the geographic restriction information is located in a header of an Internet Protocol ("IP") message of the network traffic.

12. The method of claim 11, wherein the geographic restriction information is located in an options field of the header of the IP message.

13. The method of claim 9, wherein the geographic restriction information includes at least one of:
an indication of the geographical location associated with the originating device, or
an index to a data store from which the geographical location associated with the originating device is available to be retrieved.

14. The method of claim 9, wherein the particular geographical region associated with the traffic is indicated as at least one of:
a maximum allowed distance between the geographical location associated with the originating device and a geographical location of a network device on the network path to the destination, or
a set of geographical coordinates defining the particular geographical region.

15. The method of claim 9, wherein the geographic restriction information further indicates a policy, the policy indicating the one or more actions to perform based on the determination that the second geographical location, associated with the second network device, is outside of the particular geographical region associated with the geographic restriction.

16. The method of claim 9, wherein the network traffic was sent from the originating device to an intervening device,
wherein the geographic restriction information has been added to the network traffic by the intervening device based on an analysis, by the intervening device, of payload information associated with the network traffic, wherein the network traffic, including the added geographic restriction information, is received from the intervening device.

17. A non-transitory computer-readable medium storing a plurality of processor-executable instructions which, when executed by one or more devices, causes the one or more devices to perform the method of claim 9.

18. A system, comprising:

means for receiving network traffic including an indication of a destination, the network traffic having been output by originating device;

means for identifying geographic restriction information included in the network traffic, the geographic restriction information indicating that a geographical restriction is applicable to the traffic, wherein the particular geographical region associated with the geographic restriction includes a maximum allowed distance from a geographical location associated with the originating device;

means for determining a particular geographical region, based on the maximum allowed distance from the geographical location associated with the originating device, in which the traffic is permitted to be propagated;

means for determining that a first geographical location of a first network device is within the particular geographical region associated with the geographical restriction;

means for forwarding, based on determining that the first geographical location of the first network device is within the particular geographical region associated with the geographical restriction, the network traffic to a second network device that is on a network path between the first network device and the destination;

means for determining that a geographical location of the second network device is outside of the particular geographical region associated with the geographical restriction; and means for performing one or more actions based on determining that the second geographical location of the second network device is outside of the particular geographical region associated with the geographic restriction, wherein the one or more actions include at least one of:

dropping the network traffic in lieu of forwarding the network traffic toward the destination, outputting an alert to a source of the network traffic, or outputting an alert to the destination of the network traffic.

19. The system of claim 18, wherein the network traffic is first network traffic, wherein the system further comprises:

means for identifying that second received network traffic does not include the geographic restriction information; and means for forwarding the second network traffic to a destination associated with the second network traffic based on identifying that the second network traffic does not include the geographic restriction information.

20. The system of claim 18, wherein the geographic restriction information includes at least one of:

an indication of a geographical location associated with the originating device, or an index to a data store from which the geographical location associated with the originating device is available to be retrieved.

* * * * *